Figure 1:
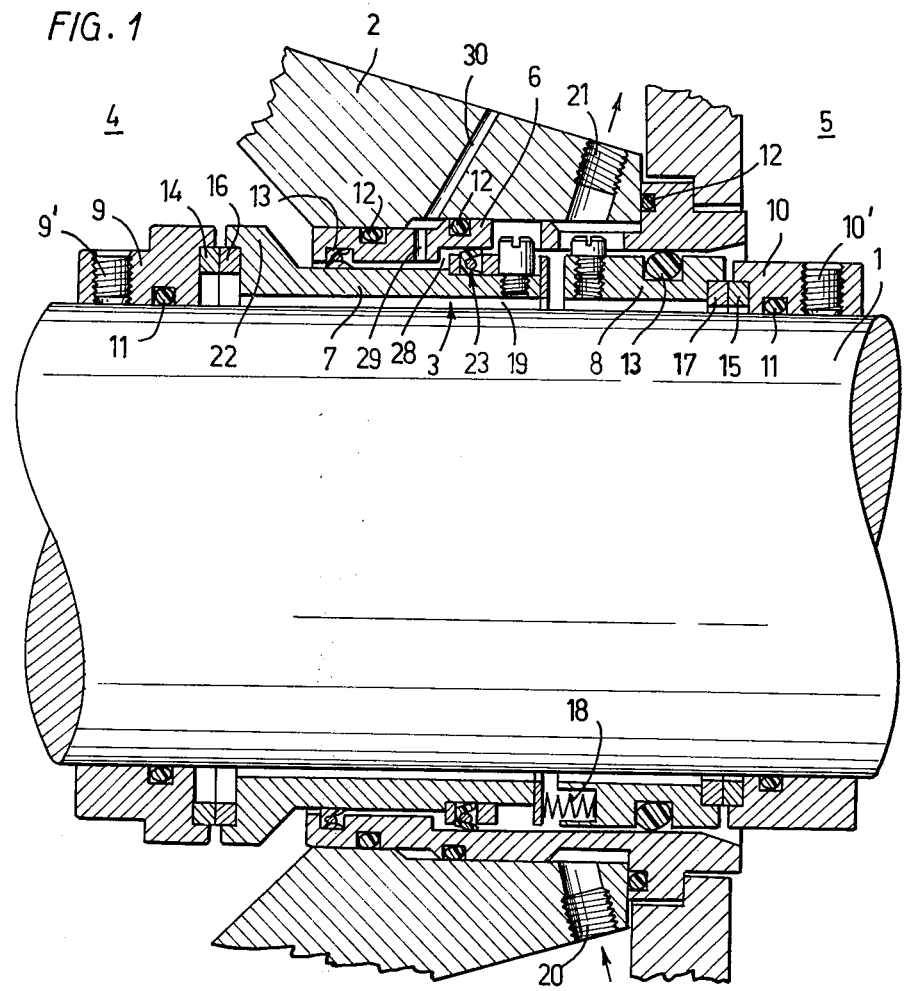

United States Patent [19]

Hytonen

[11] 4,183,540
[45] Jan. 15, 1980

[54] MECHANICAL SHAFT SEAL

[76] Inventor: Kauko Hytönen, Verajatie, Muurame 40950, Finland

[21] Appl. No.: 941,673

[22] Filed: Sep. 12, 1978

[30] Foreign Application Priority Data

Sep. 14, 1977 [FI] Finland .................................. 772705

[51] Int. Cl.² .......................... F16J 15/34; F16J 15/40
[52] U.S. Cl. ..................................... 277/27; 277/93 R
[58] Field of Search ..................... 277/3, 27, 59, 72 R, 277/72 FM, 73, 74, 93 R, 93 SD, 85

[56] References Cited

U.S. PATENT DOCUMENTS

| | | | |
|---|---|---|---|
| 3,081,095 | 3/1963 | Hamrick | 277/3 X |
| 3,184,244 | 5/1965 | Van Vleet | 277/93 R X |
| 3,339,930 | 9/1967 | Tracy | 277/27 |
| 3,360,272 | 12/1967 | Blom et al. | 277/3 |
| 3,484,113 | 12/1969 | Moore | 277/93 R X |
| 3,606,350 | 9/1971 | Grovelle | 277/27 |
| 3,738,665 | 6/1973 | Bilco | 277/3 |
| 3,888,495 | 6/1975 | Mayer | 277/3 |

*Primary Examiner*—Robert S. Ward, Jr.

*Attorney, Agent, or Firm*—Young & Thompson

[57] ABSTRACT

A mechanical shaft seal for sealing the space between a stationary element and a rotating element in order to separate an inner pressure medium space from an external space, preferably the atmosphere. The seal comprises a sealing ring mounted on one of the elements and a counter ring mounted on the other of the elements. The sealing ring and the counter-ring are provided with annular sealing slide surfaces pressed against each other by means of the pressure of the pressure medium. An intermediate space for a sealing fluid is limited by one of the elements, the sealing ring and said slide surfaces. An annular piston is provided on said sealing ring in order to press the sealing ring in a direction closing said slide surfaces and thereby to increase the closing force subjected by the sealing fluid on said slide surfaces. In this way the pressure of the sealing fluid is independent of the pressure of the pressure medium and the slide surfaces are always subjected to a closing action greater than the opening action irrespective of the pressure of the sealing fluid.

6 Claims, 4 Drawing Figures

MECHANICAL SHAFT SEAL

The subject of the present invention is a mechanical shaft seal for sealing the space between a rotatable element and a stationary element so as to separate a pressure medium space from an external space, said shaft seal comprising at least one sealing ring, mounted on one of the elements, displaceable axially and sealing in relation to this element, and at least one counter-ring, mounted on the other element, positioned on the pressure space side of said sealing ring, and sealing in relation to this other element, sealing slide surfaces provided on said sealing ring and said counter-ring, said surfaces being pressed against each other axially, an intermediate space for a sealing fluid limited by one element and sealing ring and said slide surfaces, and an annular shoulder provided on said sealing ring, by means of which shoulder the pressure of the pressure medium subjects the slide surface of the sealing ring to a closing force, which is higher than the opening force caused by the pressure of the medium on said slide surfaces and tending to separate said slide surfaces from each other.

A seal of this type is used in pumps, grinders, mixers, blowers, etc., wherein a rotable shaft passes through a stationary wall. On different sides of the wall there are normally different pressures and different liquids and gases. So, the pressure medium may be a liquid or a gas, and the external space may be a liquid or gas space subject to over- or under-pressure or atmospheric pressure, or the atmosphere. Sealing water is usually used as sealing fluid.

In several fields, it is well-known to use similar mechanical shaft seals for sealing a pressurized liquid space from the atmosphere. The sealing can be performed either by means of a seal in which the pressure of the sealing water must constantly, also when the machine is standing, be higher than the pressure of the liquid, or by means of a seal in which the pressure of the sealing water must always be lower than the pressure of the liquid.

When a seal is used in which the pressure of the sealing water always must be maintained higher than that of the liquid, it is very difficult to make sure that there is a sufficient quantity of pressurized sealing water, e.g., owing to disturbances in the supply of electricty to the feed pumps. In order to exclude disturbances in the supply of electricity in connection with the production of sufficient quantity and pressure of sealing water, it is necessary to construct complicated and expensive sealing water systems provided with emergency power sources. If, however, despite all precautions, the pressure of the sealing water of some reason decreases below the pressure of the liquid, the sealing ring facing the liquid space is axially displaced and liquid penetrates between the sealing slide surfaces and further into the sealing water space. If impurities are contained in the liquid, the slide surfaces are worn rapidly, or the impurities may cause blocking of the sealing water space or prevent renewed closure of the slide surfaces. In such a case, the seal is destroyed.

On the other hand, when a seal is used in which the pressure of the sealing water must be lower than that of the liquid, the lubricating film between the slide surfaces is formed by the liquid and not by the sealing water. If the liquid is, e.g., corrosive, the lubricating liquid film causes a faster corrosion of the slide surfaces facing the liquid space, or if the lubricating properties of the liquid are poor, this causes faster wear of said slide surfaces than when over-pressure sealing water is used. If, of some reason, the pressure of the sealing water of a seal using low pressure rises above the liquid pressure, the slide surfaces facing the liquid space are separated and liquid can penetrate into the sealing water space. Impurities in the liquid may prevent renewed closure of the sealing slide surfaces, and may block the sealing water space. The above reasons may reduce the service life of a seal essentially, and the seal may be destroyed owing to incorrect pressure of the sealing water.

The object of the present invention is to provide a mechanical shaft seal which eliminates the above drawbacks. This is achieved by means of a shaft seal in accordance with the present invention, which seal is characterized in that said sealing ring is provided with an annular piston sealing in relation to one element, said piston being subjected to the sealing fluid forcing the sealing ring towards said pressure medium space, whereby said piston is of such a size that the opening force caused by the pressure of the sealing fluid on said slide surfaces is lower than the closing force caused by said pressure of the sealing fluid and that the space of movement of the piston is by means of a channel connected with a space under pressure.

In the shaft seal produced in accordance with the invention, the pressure of the sealing fluid may be higher or lower than the pressure of the pressure medium without any risk that the slide surfaces are opened because of the action of the pressure of the pressure medium or because of the action of the of the sealing fluid or because of the simultaneous action of both said pressures. Due to the annular shoulder provided on the sealing ring the opening force caused by the pressure of the pressure medium on the slide surfaces is always lower than the closing force caused by the pressure of the pressure medium, and due to the annular piston provided on the sealing ring the opening force caused by the pressure of the sealing fluid on the slide surfaces is under all circumstances lower than the closing force caused by the pressure of the sealing fluid. Thus, the sealing efficiency of the shaft seal is independent of the magnitude of the pressure of the sealing fluid with respect to the pressure of the pressure medium. The channel passing from the space of movement of the piston to a space under constant pressure, e.g. to the atmosphere, ensures that the change of the volume of the space of movement of the piston resulting from axial displacement of the sealing ring does not affect the above mentioned conditions and thereby the operation of the seal.

Figure 2:
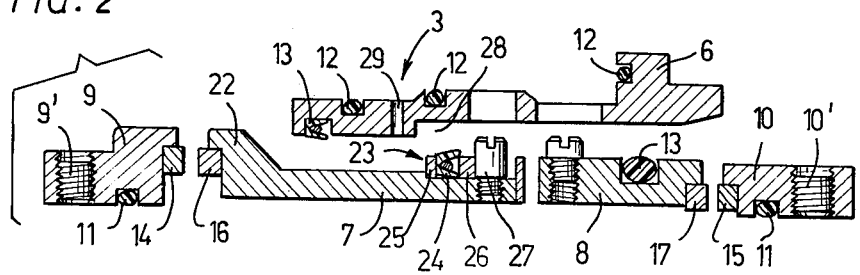
Figure 3:
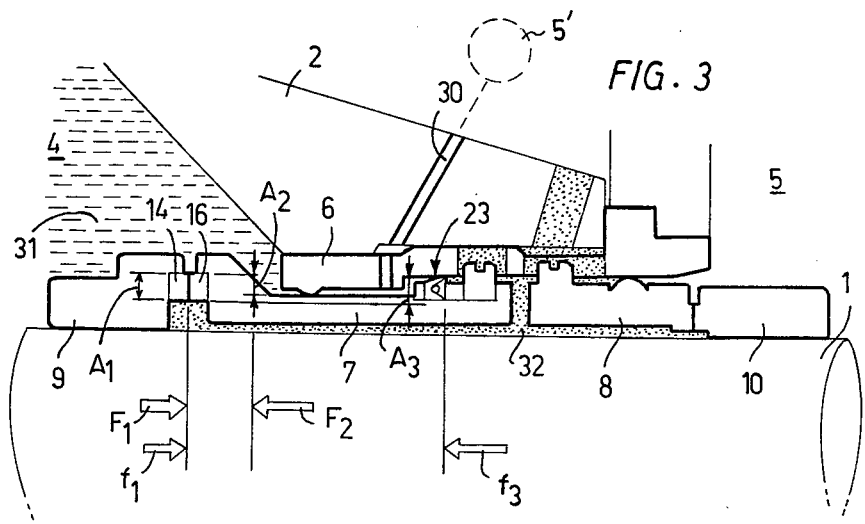
Figure 4:
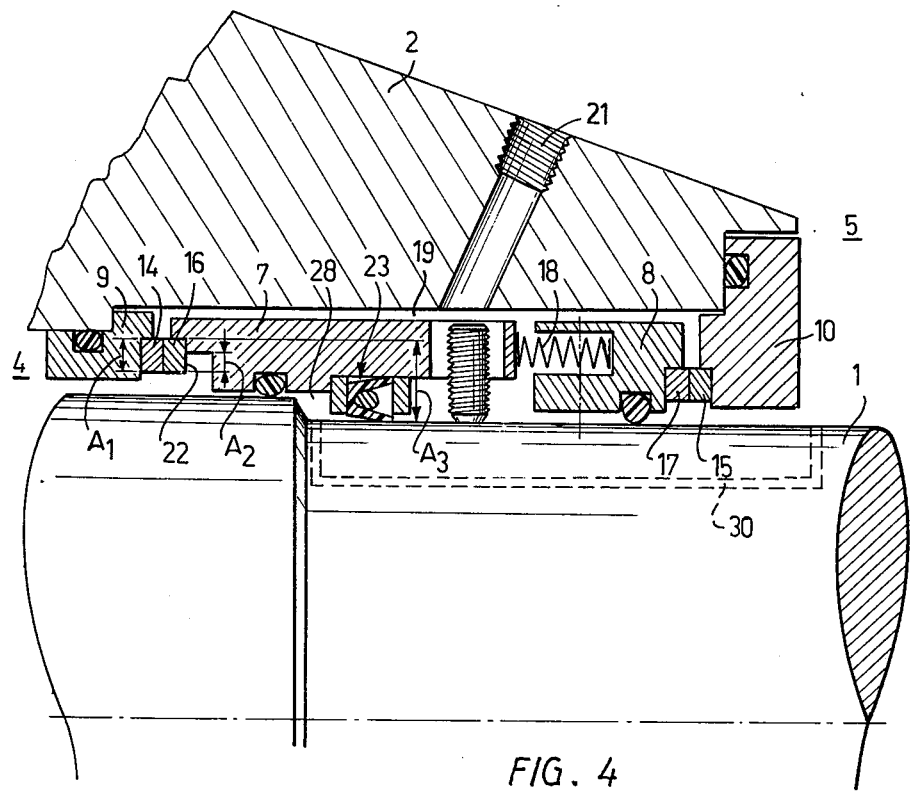

The invention will be described more closely in the following with reference to the attached drawings, wherein FIG. 1 is an axial sectional view of an advantageous embodiment of a shaft seal in accordance with the invention, said seal being mounted in sealing position, FIG. 2 is an exploded axial sectional view of the seal, FIG. 3 is an enlarged view of the principle of operation of the shaft seal, and FIG. 4 is an axial sectional view of an alternative embodiment of the shaft seal.

The drawings illustrate the rotary element, i.e. the shaft 1, and the stationary element, i.e. the housing 2 of a liquid pump. The space between the shaft and the housing is sealed by means of an annular shaft seal 3. Inside the housing (on the left side of FIG. 1) a pressure liquid space 4 is provided for pressure fluid, and outside the housing (on the right side of FIG. 1) is the atmosphere 5.

The shaft seal 3 comprises a stationary annular seal body 6 mounted on the housing, two sealing rings 7,8 positioned between the seal body and the shaft, and two counter-rings 9,10 positioned on opposite sides of the sealing rings and fastened onto the shaft. The lock screws for the counter-rings are indicated with the reference numerals 9' and 10'. The counter-rings are sealed in a way known per se against the shaft by means of ring seals 11, and the seal body 6 is sealed against the housing 2 by means of ring seals 12. The sealing rings are likewise sealed against the seal body by means of ring seals 13. Both counter-rings are provided with slide surfaces 14, 15 facing the respective sealing rings, and the ends of the sealing rings facing the counter-rings are provided with corresponding slide surfaces 16,17. Compression springs 18 provided between the sealing rings press the sealing rings away from each other so that said slide surface 14–17 are pressed against each other in pairs. An intermediate space 19 remains between the sealing rings and the shaft for sealing water. The housing is provided with an inlet channel 20 and an outlet channel 21 for sealing water. The sealing ring adjacent the pressure liquid space 4 is provided with an annular shoulder 22 for a purpose to be explained later.

An annular sealing piston 23 is fastened to the outer end of the sealing ring 7 adjacent the pressure liquid space 4. Said piston includes an elastic ring seal 24 (FIG. 2). Support plates 25, 26 are provided on opposite sides of seal 24. The combination of elements 24,25,26 is fastened axially stationary to the sealing ring 7 by means of a screw 27. For the piston, a cylindrical recess 28 is formed into the seal body 6, in which recess the piston can be axially displaced along with the sealing ring. A radial channel 29 extends through the seal body, which channel is at its inner end connected with said recess through an intermediate space extending between said recess and the ring seal 13. The channel 29 in the seal body is connected to the atmosphere 5 through a channel 30 extending through the body.

In the construction described above, pressure liquid 31 (FIG. 3) from the pressure liquid space 4 tends to penetrate between the slide surfaces 14,16 of the counter-ring and the sealing ring thereby producing a force $F_1$ which tends to separate the slide surfaces $$F_1 = (p_n/2) \cdot A_1, \quad (1)$$

wherein $p_n$ is the pressure of the pressure liquid and $A_1$ is the effective area of the slide surfaces subjected to the pressure liquid. The pressure liquid also acts upon the shoulder 22 and produces a force $F_2$ which tends to close said slide surfaces 14,16

$$F_2 = p_n \cdot A_2, \quad (2)$$

wherein $A_2$ is the effective area of the shoulder subjected to the pressure liquid.

Correspondingly, sealing water 32 supplied through the channel 20 into the intermediate space 19 tends to penetrate between said slide surfaces 14,16 and produces a force $f_1$ which tends to separate the slide surfaces $$f_1 = (p_t/2) \cdot A_1, \quad (3)$$

wherein $p_t$ is the pressure of the sealing water. The sealing water also acts upon the piston 23 described above and correspondingly produces a force $f_3$, which tends to close the slide surfaces 14,16

$$f_3 = p_t \cdot A_3, \quad (4)$$

wherein $A_3$ is the effective area of the piston subjected to the sealing water.

If the force of the springs 18 closing the slide surfaces 14,16 is indicated with $F_j$, the slide surfaces remain closed if $$F_2 + f_3 + F_j > F_1 + f_1. \quad (5)$$

If the pressure $p_t$ of the sealing water is 0, i.e. lower than the pressure of the pressure liquid (and the spring force $F_j$ is, for the sake of simplicity marked as=0), the condition (5) is fulfilled when $$A_2 > (A_1/2) \quad (p_t = 0). \quad (6)$$

If the pressure $p_n$ of the pressure liquid is 0, i.e. the pressure of the sealing water is higher than the pressure of the pressure liquid, the condition (5) is fulfilled when $$A_3 > (A_1/2) \quad (p_n = 0). \quad (7)$$

If the pressure $p_t$ of the sealing water and the pressure $p_n$ of the pressure liquid are equal, the condition (5) is fulfilled when $$A_2 + A_3 > A_1 \quad (p_t = p_n). \quad (8)$$

From FIG. 3 it is seen that by providing the sealing ring 7 with a piston 23 of the type described above it is always possible to obtain a closing force $f_3$ higher than the opening force $f_1$ acting on the slide surfaces 14,16 irrespective of whether the pressure of the sealing water is lower than, higher than, or equal to the pressure of the pressure liquid.

The connection of the recess 28 for the piston 23 through the channels 29,30 with the atmosphere ensures that the change in volume of said recess resulting from axial movement of the piston does not cause additional axial forces in the seal which would oppose the fulfilment of the above mentioned condition (5).

In the above formulae it has been assumed that the spring force of the springs 18 is unessential, i.e. that the springs are dimensioned only to cause a preliminary pressing of the slide surfaces 14,16 and 15,17, respectively, against each other. It is, however, obvious that the higher the spring force is, the more does it increase the closing force $f_3$ caused by the piston 23. Thus, when the spring force becomes higher, the area of the piston can be made correspondingly smaller.

In the embodiment shown in FIG. 4, the same reference numerals have been used for the same element as in the former embodiment. The construction in accordance with FIG. 4 differs from the former construction mainly only in the respect that the sealing rings 7,8 are mounted on the shaft 1, instead of on the housing 2, and the counter-rings 9,10 are mounted on the housing 2, instead of on the shaft.

The drawings and the related description are only intended to illustrate the idea of the invention. In its details the seal in accordance with the invention may show even considerable variations within the scope of the claims. Instead of the slide-surfaces 15,17, the sealing with respect to the atmosphere may be achieved by means of some other axial seal. The sealing rings 7,8 may seal against sealing surfaces machined directly in the housing 2, in which case the sealing body 6 may be omitted. Even though two separate sealing rings 7,8 have been described above, it is possible to arrange the sealing ring 7 so that it seals directly against an external counter-ring 10, in which case the sealing ring 8 is omitted. Instead of separate pieces 24,25,26, the piston 23 may consist of an annular flange integral with the sealing ring 7, which flange seals against the sealing body 6. In the embodiment shown in FIG. 2 the piston 23 is fastened axially stationary to the sealing ring, but it is possible that there is a clearance between the piston and the screw 27, because from the point of view of the invention it is essential only that the piston 23 is pressed tightly against the sealing ring 7 in the direction towards the pressure liquid space 4. Instead of a channel 30 extending through the housing 2, the channel 29 in the seal body 6 may extend axially through the seal body and end into atmosphere 5 through the outer end surface of the seal body. Instead of the atmosphere, the recess 28 may be connected through the channels 29,30 with a separate, closed space under constant pressure, as indicated with dotted lines 5' in FIG. 3, which space maintains the pressure in the recess 28 unchanged in spite of the axial movement of the piston in said recess.

What I claim is:

1. A mechanical shaft seal for sealing the space between a rotable element and a stationary element so as to separate a pressure medium space from an external space, said shaft seal comprising at least one sealing ring, mounted on one of the elements, displaceable axially and sealing in relation to this element, and at least one counter-ring, mounted on the other element, positioned on the pressure space side of said sealing ring, and sealing in relation to this other element, sealing slide surfaces provided on said sealing ring and said counter-ring, said surfaces being pressed against each other axially, an intermediate space for a sealing fluid limited by one element and said sealing ring and said slide surfaces, and an annular shoulder provided on said sealing ring, by means of which shoulder the pressure of the pressure medium subjects the slide surface of the sealing ring to a closing force, which is higher than the opening force caused by the pressure of the pressure medium on said slide surfaces and tending to separate said slide surfaces from each other, characterized in that said sealing ring is provided with an annular piston sealing in relation to one element, said piston being subjected to the sealing fluid forcing the sealing ring towards said pressure medium space, whereby said piston is of such a size that the opening force caused by the pressure of the sealing fluid on said slide surfaces is lower than the closing force caused by said pressure of the sealing fluid and that the space of movement of the piston is by means of a channel connected with a space under pressure.

2. A shaft seal according to claim 1 wherein an annular seal body (7) is fixed axially stationary to said stationary element (2), against which seal body said sealing ring (7) seals, characterized in that a cylindrical recess (28) extending around the inner circumference of the seal body is provided in the seal body (6) for axial movement of the piston (23) and that said recess is connected with said space (5) under pressure through a connecting channel (29) extending through the seal body.

3. A shaft seal according to claim 2, characterized in that said connecting channel (29) is connected with the atmosphere (5) through a channel (30) provided in said stationary element (2).

4. A shaft seal according to claim 2, characterized in that said connecting channel extends axially through the seal body (6) and ends into the outer end surface of the seal body, which is subjected to the atmosphere.

5. A shaft seal according to claim 1, characterized in that the effective areas of the slide surfaces (14,16), the shoulder (22), and the piston (23) are dimensioned so that $$A_2 > A_1/2 \text{ and } A_3 > A_1/2 \text{ as well as } A_2 + A_3 > A_1,$$

wherein $A_1$ = the effective slide surface area subjected to the pressure medium, $A_2$ = the effective shoulder area subjected to the pressure medium and, $A_3$ = the effective piston area subjected to the sealing fluid.

6. A shaft seal according to claim 1 or 2, characterized in that said piston (23) comprises an elastic ring seal (24,25,26) supported by the seal ring (7).

* * * * *